Jan. 11, 1966 C. J. UNDERWOOD 3,228,705
ROTARY SEALING DEVICES
Filed March 7, 1963
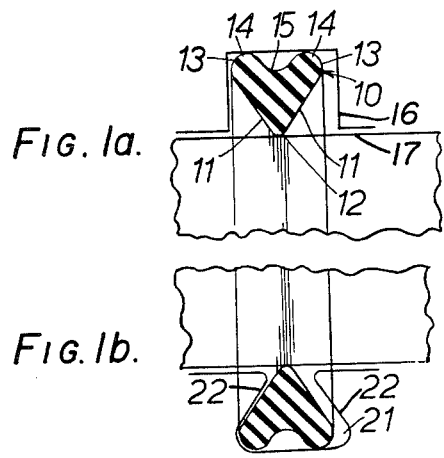
Fig. 1a.
Fig. 1b.
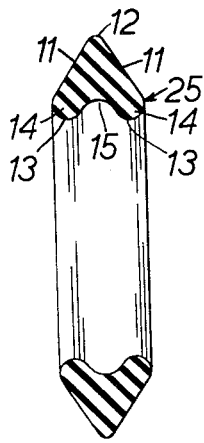
Fig. 2.
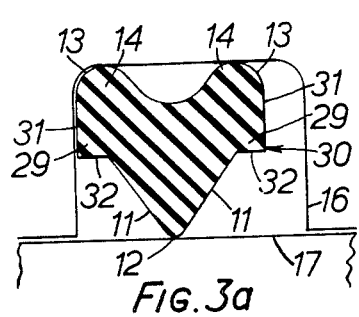
Fig. 3a.
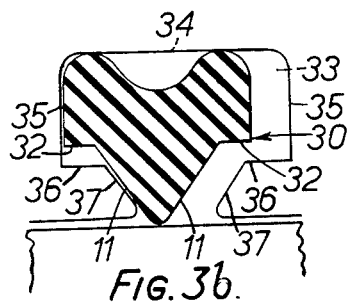
Fig. 3b.
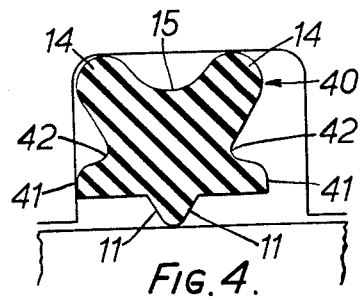
Fig. 4.
INVENTOR
CYRIL J. UNDERWOOD
BY
Reynolds + Christmas
ATTORNEYS

United States Patent Office 3,228,705
Patented Jan. 11, 1966

3,228,705
ROTARY SEALING DEVICES
Cyril J. Underwood, Coberley, near Cheltenham, England, assignor to Dowty Seals Limited, Ashchurch, near Tewkesbury, England, a British company
Filed Mar. 7, 1963, Ser. No. 263,626
Claims priority, application Great Britain, Mar. 13, 1962, 9,656/62
4 Claims. (Cl. 277—206)

This invention relates to a sealing assembly and to a form of sealing ring for use therein. More specifically, this invention is concerned with a sealing assembly suitable for use with low fluid pressures, as for example in fluid supply systems where the fluid pressure to which the sealing device is subjected is low or very low compared with the fluid pressures currently used in fluid power systems. Examples of such low pressure uses occur in rotary or swivel joints, pump shaft seals, and dirt excluders.

According to this invention, a sealing ring of resiliently elastic material, such as is in use mounted with some freedom to move or "float" axially within a recess or groove in one of two relatively movable elements, has radially inner and outer margins, of which one margin is provided by a narrow but slightly rounded dynamic sealing lip that bears against the surface of the second of such members, while the other margin of the ring is provided by two similar static sealing lips spaced axially and equally on opposite sides of a plane through the dynamic sealing lip and perpendicular to the ring's axis, which static sealing lips seat at the bottom of the recess, and prevent rolling of the ring as the two members move relatively, and particularly if such movement is in the axial direction and causes the ring to float axially. The face of the ring intermediate the two static sealing lips is formed as a groove that is shallow as compared to the total radial depth of the ring, the function of which groove is primarily to relieve bearing except at the static sealing lips. The total radial depth of the ring, when installed, is less than the spacing between the two surfaces whereon the static and the dynamic sealing lips seat, whereby these three lips are pressed against their respective seating surfaces by the inherent resilience of the ring, and independently of any fluid pressure acting upon the ring. The dynamic sealing lip is shaped and arranged to flatten but slightly when the ring is not subject to pressure fluid, wherefore it bears against the surface which it contacts with little more than the unit pressure necessary to provide a satisfactory seal; the total pressure, being proportional to the area, will be small and therefore the frictional drag exerted by the seal will be correspondingly small. Because the static sealing lips bear against the bottom or their recess, even when the ring is at rest, pressure fluid will not gain access to the groove between them when the ring is subjected to pressure. Rather, when the ring is subjected to pressure, the pressure fluid acts against an end face of the ring, tending to flatten the ring axially and to expand it radially inwardly as well as outwardly, and thereby urging the three sealing lips the tighter against their seating surfaces, with a pressure that is always proportional to the fluid pressure.

The invention is illustrated in the accompanying drawings, of which:

FIGURE 1a shows one form of resilient sealing ring having an inner dynamic sealing lip seated within the outline of a rectangular groove, and FIGURE 1b shows the same ring seated within the outline of a groove that conforms more closely to the ring's shape;

FIGURE 2 shows a ring of similar cross-section having an outer dynamic sealing lip;

FIGURE 3 shows a modified ring section with two different forms of mounting recess at (a) and (b), as in FIGURES 1a and 1b; and FIGURE 4 shows a further form of ring section.

In FIGURE 1 the resilient sealing ring 10 is seen to have, in cross-section, frusto-conical end surfaces 11 equally but oppositely inclined to the central axis of the ring at an angle of approximately 55°. The end surfaces 11 define a dynamic sealing lip 12 which has a rounded apex forming the radially inner margin of the ring, while radially outwardly the end surfaces 11 merge into marginal surfaces 13 of semi-circular cross-section. The surfaces 13 form the boundaries of two static sealing lips 14 between which the face of the ring 10 is formed as a groove 15. The greatest radial depth of the groove 15, occuring in the transverse plane of symmetry of the ring, is approximately one quarter of the radial depth of the ring 10. The base of the groove 15 is of concave curvature in cross-section.

In the section at FIGURE 1a there is shown the generally rectangular outline of a mounting recess 16 to be provided in one member when the lip 12 has to seal against a rotatable shaft, the cylindrical surface of which is shown at 17. The outer diameter of the static sealings lips 14 in their free state is slightly greater than the diameter of the base of the mounting recess 16, while the diameter of the sealing lip 12 in its free state is equal to or slightly greater than the diameter of the shaft surface 17.

The dimensions of the ring 10 are such that when it is mounted in radial compression within the mounting recess 16, the sealing lip 12 is caused by this radial compression to bear resiliently against the surface of shaft 17. The presence of the annular recess radially outwardly of the dynamic sealing lip 12 provides a greater resilience in the ring which ensures that the static sealing lips 14 may be sufficiently compressed in the mounting recess 16 to give a satisfactory seal without causing excessive pressure of the dynamic sealing lip 12 against the shaft surface 17. However, lips 14 seal sufficiently tightly to exclude pressure fluid from the groove 15.

The sealing ring 10 has axial clearance within the mounting recess 16 so that the fluid pressure to be sealed which has access to the recess at one end acts over one entire end face of the ring 10 lying between the base of the recess 16 and the shaft surface 17. Under the fluid pressure loading on one end face both static sealing lips 14 tend to draw close, and bend towards a more radial direction, the one lip under fluid pressure and the other under the reaction load of the restraining end wall of the recess 16, thereby tending to displace the main body of the ring 10 radially inwardly and pressing the sealing lip 12 more firmly against the shaft surface 17, and the sealing lips 14 more tightly against the bottom of recess 16. The sealing pressure tends to rise in proportion to the fluid pressure acting on the sealing ring.

The relationship of sealing pressure and fluid pressure is influenced by the angle of the ring cross-section at the dynamic sealing lip. If the angle is increased the sealing pressure caused by a given fluid pressure is reduced because the radial component of fluid pressure on the loaded surface 11 acts more strongly to lift the dynamic sealing lip 12 from the surface to be sealed. The angle is made as large as possibel so long as an adequate fluid seal is established by the lip 12. In this way seal friction is kept to a minimum, and the ring 10 has greater stability against rolling action caused by fluid pressure. The axially spaced static sealing lips 14 also assist in resisting rolling action.

The dynamic sealing lip 12 is rounded sufficiently sharply that it yields under sealing pressure against the shaft surface 17 over an axial distance which is a small fraction of the axial length of the ring 10. The total pressure, being proportional to the area of contact, is therefore small and the frictional drag exerted by the sealing lip 12 on the shaft surface is correspondingly small.

In FIGURE 1a the outlined recess 16 is of rectangular cross-section whereas in FIGURE 1b a form of mounting recess 21 is shown to enable sealing ring 10 when used against an axially movable shaft 17 to resist additionally any rolling tendency. The recess 21 has end walls 22 conforming in shape to the end faces of the ring 10 so as to provide support against rolling of the ring under axial drag forces at the sealing lip 12. The ring 10 has overall axial clearance between the end walls 22.

In FIGURE 2 the sealing ring 25 has a similar cross-section to that FIGURES 1a and 1b but the section is reversed so that the dynamic sealing lip 12 forms the radially outer margin. The sealing ring 25 is suitable for use as a piston seal movable axially in a cylinder and for such use a mounting recess having conforming end walls as in FIGURE 1b is desirable. The ring 25 is slightly stretched to fit into its mounting recess whereby the lip 12 is expanded radially to provide sealing pressure against the cylinder bore.

FIGURES 3a and b show a sealing ring 30 of modified cross-section more convenient for production by moulding but not differing essentially in its functioning from the sealing ring 10 of FIGURE 1. Like reference numerals are used where appropriate, and it is seen that each frusto-conical end surface 11 is separated from the semi-circular sectioned lip surface 13 by an annular axial projection 29 having a transverse face 31 and a cylindrical face 32. For use as a seal between relatively rotatable members, FIGURE 3a, the sealing ring is housed in rectangular sectioned mounting recess 16 outlined in FIGURE 1a. For use between members which are relatively movable axially, FIGURE 3b, a mounting recess 33 is provided having a cylindrical wall 34 at the base of the recess, and at each end thereof a transverse wall 35, a cylindrical step 36 spaced from the cylindrical face 32, and a frusto-conical wall 37 conforming to the end wall 11 of the sealing ring.

Sealing rings as described in the foregoing examples are suitable for use in low pressure applications such as for sealing pump shafts against fluid pressures of 10 to 15 pounds per square inch or thereabouts. These pressures usually experienced in such applications do not necessarily represent the limit of usefulness of the present invention, as with suitable design and appropriate resilience of the sealing ring material, their usefulness can be extended to considerably higher pressures.

For such higher pressure applications the ring section illustrated in FIGURE 4 is suitable in that it is better supported in a rectangular mounting recess against a tendency to roll under the application of fluid pressure at one end of the mounting recess. From each frusto-conical surface 11 of the ring 40 there is an annular projection 41 which extends axially as far as the adjacent static sealing lip 14. Each projection 41 lies at approximately one quarter of the radial depth of the ring section from the dynamic sealing lip 12 and it is separated from the adjacent lip 14 by a groove 42. Each projection 41 can bear against one end face of the mounting recess 16 to support the ring 40 against a tendency to roll under the application of fluid pressure to the opposite end face of the ring 40.

The annular projections 29 of FIGURE 3 and 41 of FIGURE 4 are shown circumferentially continuous, but they may be made discontinuous, for example by radial slots, and still serve the same purpose of providing support.

I claim as my invention:

1. A sealing ring assembly comprising two relatively movable members of which one is provided with an annular seal-receiving recess having a cylindrical base seating surface lying between opposite end surfaces, and of which the other has a cylindrical seating surface spaced concentrically by a given distance from the cylindrical base seating surface, and a resilient sealing ring disposed in the recess with axial clearance between the end surfaces thereof but of a size to fit with radial compression between the concentrically spaced seating surfaces of the two members, said sealing ring having a cross-section which is symmetrical about a plane transverse to the central axis of the ring, and said cross-section being defined at least in part by two end surfaces of the ring which converge on opposite sides of the plane of symmetry, at an included angle which is somewhat less than a right angle, to form a dynamic sealing lip having a narrow sealing edge lying substantially at the intersection of said end surfaces, and by a third surface which has an annular groove in the plane of symmetry and which forms with said convergent end surfaces two static sealing lips respectively disposed on opposite sides of the groove against the seating surface of the recess, each static sealing lip being lip being yieldable towards the plane of symmetry under the application of fluid pressure within the axial clearance space between one end face of the recess and the adjacent end surface of the sealing ring, whereby the resulting reduction of distance between the fluid-pressure-actuated static sealing lip and the dynamic sealing lip causes each thereof to bear with increased radial pressure against the respective seating surfaces.

2. A sealing ring assembly according to claim 1, wherein the convergent end surfaces meet at an included angle of approximately 70°.

3. A sealing ring assembly according to claim 1, wherein the radial depth of the groove is approximately one quarter of the radial depth of the ring section.

4. A sealing ring assembly comprising two relative movable members of which one is provided with an annular seal-receiving recess having a cylindrical base seating surface lying between opposite end surfaces which are substantially transverse to the central axis of the annular recess, and of which the other has a cylindrical seating surface spaced concentrically from the cylindrical base seating surface, and a resilient sealing ring disposed in the recess with axial clearance between the end surfaces thereof but with radial compression between the concentrically spaced seating surfaces of the two members, said sealing ring having a cross-section which is symmetrical about a plane transverse to the central axis of the ring, and said cross-section being defined by two end surfaces of the ring which converge on opposite sides of the plane of symmetry at an included angle which is somewhat less than a right angle, to form a dynamic sealing lip having a narrow sealing edge lying substantially at the intersection of said end surfaces, a third surface which has an annular groove in the plane of symmetry and which forms with said convergent end surfaces two static sealing lips respectively disposed on opposite sides of the groove against the seating surface of the recess, and an annular projecting portion of the ring extending axially from each of said end surfaces substantially as far as the static sealing lip on the same side of the ring, each static sealing lip being yieldable towards the plane of symmetry under the application of fluid pressure to the axial clearance space between one end face of the recess and the adjacent end surface of the sealing ring, whereby the resulting reduction of distance between the fluid-pressure-actuated static sealing lip and the dynamic sealing lip causes each thereof to bear with increased radial pressure against the respective seating surfaces.

References Cited by the Examiner
UNITED STATES PATENTS

| | | | |
|---|---|---|---|
| 671,697 | 4/1901 | Hammon | 277—205 |
| 2,314,683 | 3/1943 | Berry | 277—177 |
| 2,521,248 | 9/1950 | Parker | 277—177 |
| 2,647,002 | 7/1953 | Brummer | 277—206 X |
| 2,783,068 | 2/1957 | Bloom et al. | 277—177 |

(Other references on following page)

UNITED STATES PATENTS

| | | | |
|---|---|---|---|
| 2,841,429 | 7/1958 | McCuiston | 277—209 |
| 2,873,132 | 2/1959 | Tanner | 277—207 X |
| 2,892,644 | 6/1959 | Collins | 277—206 X |
| 2,964,343 | 12/1960 | Klingler | 277—168 |
| 2,968,501 | 1/1961 | Tish | 277—177 |
| 3,027,167 | 3/1962 | Liebig | 277—171 |
| 3,028,165 | 4/1962 | Collins | 277—206 |
| 3,052,476 | 9/1962 | Workmann | 277—174 |
| 3,106,406 | 10/1963 | Liebig | 277—171 |
| 3,117,795 | 1/1964 | Liebig | 277—205 |

FOREIGN PATENTS

| | | |
|---|---|---|
| 1,183,249 | 7/1959 | France. |
| 356,648 | 10/1961 | Switzerland. |

LAVERNE D. GEIGER, *Primary Examiner.*

EDWARD V. BENHAM, *Examiner.*